(12) United States Patent
Rapp et al.

(10) Patent No.: US 9,146,836 B2
(45) Date of Patent: Sep. 29, 2015

(54) LINKING DIAGNOSTIC VISUALIZATIONS TO APPLICATION CODE

(75) Inventors: James Rapp, Redmond, WA (US);
Daniel Griffing, Covington, WA (US);
Alexander Dadiomov, Redmond, WA (US); Matthew Jacobs, Seattle, WA (US); Ben Nesson, Seattle, WA (US);
Drake A. Campbell, Seattle, WA (US);
Mayank Agarwal, Bellevue, WA (US);
Paulo Cesar Sales Janotti, Issaquah, WA (US); Xinhua Ji, Redmond, WA (US); Eric Ledoux, Bellevue, WA (US);
Alexey Kamenev, Bellevue, WA (US);
Jared Robert Van Leeuwen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 859 days.

(21) Appl. No.: 13/324,488

(22) Filed: Dec. 13, 2011

(65) Prior Publication Data

US 2013/0152052 A1  Jun. 13, 2013

(51) Int. Cl.
*G06F 9/44* (2006.01)
*G06F 11/36* (2006.01)
*G06F 11/32* (2006.01)

(52) U.S. Cl.
CPC .......... *G06F 11/3664* (2013.01); *G06F 11/321* (2013.01); *G06F 11/323* (2013.01)

(58) Field of Classification Search
None
See application file for complete search history.

(56) References Cited

U.S. PATENT DOCUMENTS

| | | | |
|---|---|---|---|
| 6,189,114 B1* | 2/2001 | Orr | 714/25 |
| 6,300,948 B1* | 10/2001 | Geller et al. | 715/866 |
| 6,332,212 B1* | 12/2001 | Organ et al. | 717/128 |
| 7,493,310 B2* | 2/2009 | Eryurek et al. | 1/1 |
| 7,523,349 B2* | 4/2009 | Barras | 714/25 |
| 8,745,086 B2* | 6/2014 | Cardno et al. | 707/778 |
| 8,997,058 B2* | 3/2015 | Bohnet et al. | 717/128 |
| 2003/0233631 A1* | 12/2003 | Curry et al. | 717/100 |
| 2006/0156237 A1* | 7/2006 | Williams et al. | 715/720 |

(Continued)

OTHER PUBLICATIONS

Shafi, Hazim, "Performance Tuning with the Concurrency Visualizer in Visual Studio 2010", Mar. 2010, http://msdn.microsoft.com/en-us/magazine/ee336027.aspx.

(Continued)

*Primary Examiner* — Don Wong
*Assistant Examiner* — Hossain Morshed
(74) *Attorney, Agent, or Firm* — Kevin Sullivan; Stein Dolan; Micky Minhas

(57) ABSTRACT

The present invention extends to methods, systems, and computer program products for linking diagnostic visualizations to regions of application code. Diagnostic visualizations emitted during execution of an application are displayed. The diagnostic visualizations partially represent the abstract objective of the application (e.g., as envisioned by a developer). Diagnostic data for at least one of a plurality of components is displayed. The diagnostic data indicates the performance of the at least one of the plurality of components during execution of the application. The displayed one or more diagnostic visualizations and the displayed diagnostic data is correlated to link the one or more diagnostic visualizations to the at least one of the plurality of components. Linking the one or more diagnostic visualizations to the at least one of the plurality of components can better indicate how the application's behavior reconciles the abstract objective.

20 Claims, 5 Drawing Sheets

(56) References Cited

U.S. PATENT DOCUMENTS

| | | | |
|---|---|---|---|
| 2007/0239418 A1* | 10/2007 | Harrison et al. | 703/13 |
| 2008/0022843 A1* | 1/2008 | Drukman et al. | 84/609 |
| 2008/0222455 A1* | 9/2008 | Caldwell et al. | 714/38 |
| 2009/0249290 A1* | 10/2009 | Jenkins et al. | 717/109 |
| 2009/0267946 A1* | 10/2009 | Agutter et al. | 345/440 |
| 2009/0319996 A1 | 12/2009 | Shafi et al. | |
| 2010/0017740 A1* | 1/2010 | Gonzalez Veron et al. | 715/777 |
| 2010/0218045 A1* | 8/2010 | McAllister et al. | 714/35 |
| 2013/0097544 A1* | 4/2013 | Parker et al. | 715/771 |
| 2013/0152052 A1* | 6/2013 | Rapp et al. | 717/125 |
| 2014/0043337 A1* | 2/2014 | Cardno | 345/440 |
| 2014/0225895 A1* | 8/2014 | Farchmin et al. | 345/428 |

OTHER PUBLICATIONS

Wu, C.E., et al., From Trace Generation to Visualization: A Performance Framework for Distributed Parallel Systems1, Feb. 13, 2006, Supercomputing, ACM/IEEE 2000 Conference https://ieeexplore.iee.org/stamp/stamp.jsp?tp=&arnumber=1592763.

Ball, Thomas A., et al., "Software Visualization in the Large", Apr. 1996 http://pfp7.cc.yamaguchi-u.ac.jp/~ichikawa/iv/resources/softvis_copyright.pdf.

Harmon, Trevor, et al., "Automatic Performance Visualization of Distributed Real-Time Systems", Apr. 2006 Proceedings of the Ninth IEEE International Symposium on Object and Component-Oriented Real-Time Distributed Computing.

\* cited by examiner

300

Span Colors:

| Gray Span | Red Span | Blue Span | Green Span | Yellow Span | Cyan Span | Magenta Sp... |
|---|---|---|---|---|---|---|
| 301A | 301B | 301C | 301D | 301E | 301F | 301G |

| Category | Description | Public API Category | Span Fill Color | Span Text Color |
|---|---|---|---|---|
| -1 | Approximately Red ~ 303 | CategoryAlert ~ 306 | #D35F69 ~ 305 | #FFFFFF |
| 0 | Approximately Blue ~ 303 | CategoryDefault ~ 306 | #6764D4 ~ 305 | #FFFFFF |
| 1 | Approximately Green ~ 303 | | #75D35F ~ 305 | #FFFFFF |
| 2 | Approximately Yellow ~ 303 | | #FBF551 ~ 305 | #505050 |
| 3 | Approximately Cyan ~ 303 | | #5CD2C3 ~ 305 | #505050 |
| 4 | Approximately Magenta ~ 303 | | #D054C9 ~ 305 | #FFFFFF |
| | Approximately Gray – This ~ 303 Color Is Reserved (Users Cannot Use It); It Represents Aggregated Markers | | #797979 ~ 305 | #FFFFFF |

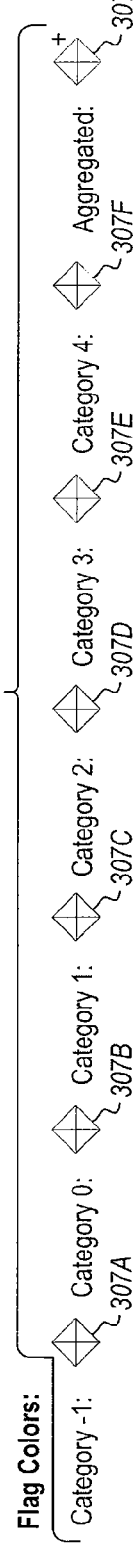

Flag Colors:

Category -1: ◇ 307A   Category 0: ◇ 307B   Category 1: ◇ 307C   Category 2: ◇ 307D   Category 3: ◇ 307E   Category 4: ◇ 307F   Aggregated: ◇ 307G Text Associated With Flags Is Always This Color: #505050

Message Colors:

Fill Color: #80000000 ~ 308

*Figure 3*

LINKING DIAGNOSTIC VISUALIZATIONS TO APPLICATION CODE

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

During the development, software developers often utilize the hardware execution information for computer components in order to make sure that the application is working properly or and/to optimize the overall performance accordingly. However, when software developers write applications with a particular mental model of the way it executes, the mental model can differ sometimes, drastically, from the applications' behavior during execution on the computer components.

For example, a software developer may write the application for the purpose of measuring a temperature. However, the various hardware information obtained during execution of the application indicates reading or writing data from a certain memory address. Some tools for developers can present hardware execution information. However, at least some of these tools fail to match different portions of relevant information together. Thus, it is still difficult for developers to make sense of the data.

BRIEF SUMMARY

The present invention extends to methods, systems, and computer program products for linking diagnostic visualizations to regions of application code. One or more diagnostic visualizations emitted during execution of an application are displayed. The one or more diagnostic visualizations partially represent the abstract objective of the application (e.g., as envisioned by a developer). Diagnostic data for at least one of a plurality of components is displayed. The diagnostic data indicates the performance of the at least one of the plurality of components during execution of the application. The displayed one or more diagnostic visualizations and the displayed diagnostic data is correlated so as to link the one or more diagnostic visualizations to the at least one of the plurality of components. Linking the one or more diagnostic visualizations to the at least one of the plurality of components can better indicate how the application's behavior reconciles the abstract objective.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example method for color coding diagnostic visualizations;

DETAILED DESCRIPTION

Figure 1:
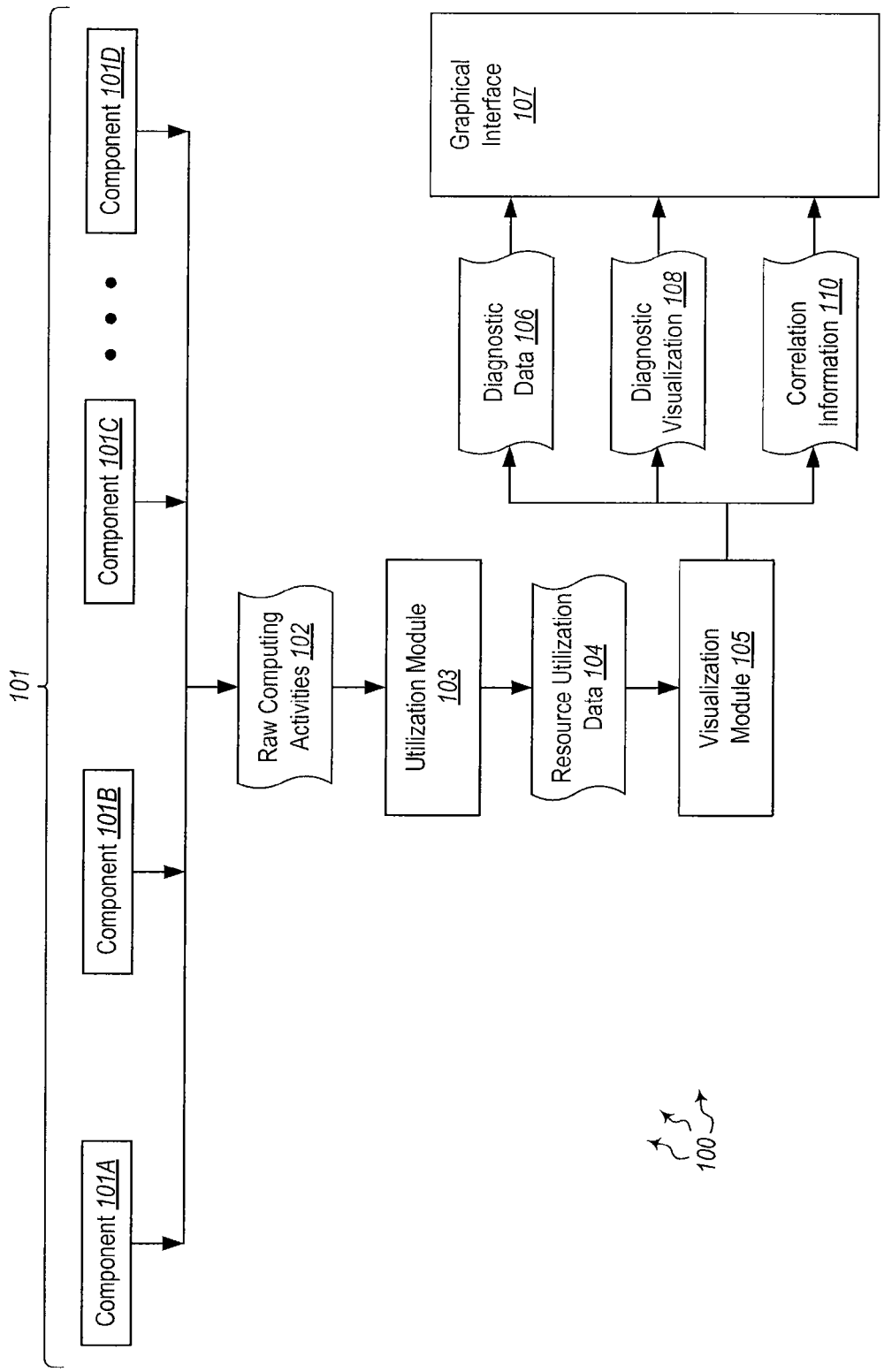
FIG. 1 illustrates an example computer architecture that facilitates linking diagnostic visualizations to regions of application code.

The present invention extends to methods, systems, and computer program products for linking diagnostic visualizations to regions of application code. One or more diagnostic visualizations emitted during execution of an application are displayed. The one or more diagnostic visualizations partially represent the abstract objective of the application (e.g., as envisioned by a developer). Diagnostic data for at least one of a plurality of components is displayed. The diagnostic data indicates the performance of the at least one of the plurality of components during execution of the application. The displayed one or more diagnostic visualizations and the displayed diagnostic data is correlated so as to link the one or more diagnostic visualizations to the at least one of the plurality of components. Linking the one or more diagnostic visualizations to the at least one of the plurality of components can better indicate how the application's behavior reconciles the abstract objective.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates linking diagnostic visualizations to regions of application code. Referring to FIG. 1, computer architecture 100 includes components 101 (101A-101D). The ellipsis between 101C and 101D represents that one or more additional components can exist. Thus, there may be as few as two such components, but there might also be as many as thousands or perhaps more components.

Each of the depicted components may be separate independent computer systems or computer components of a single computer system. For example, components 101 can be GPUs, hard disks, CPUs, or even cores of a CPU.

Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, computer architecture 100 includes utilization module 103, visualization module 105, and graphical interface 107. Components 101 can output raw computing activities 102. Utilization module 103 is configured to receive raw computing activities 102 from components 101. Raw computing activities 102 may be any type of computing activities, including reading or writing operations to hard disks, calculations by CPU, or transmissions of data over a network. Upon receiving raw computing activities 102, utilization module 103 can generate resource utilization data 104. Resource utilization data 104 can indicate different performance of components 101 including executions, synchronizations, input/output operations, sleep time, memory management, preemption, or UI processing.

In some embodiments, based on resource utilization data 104, visualization module 105 generates and submits diagnostic data 106, diagnostic visualizations 108, and correlation information 110 to graphical interface 107. Diagnostic data 106 indicates the performance of components 101 during part of the execution of the application. Diagnostic visualizations 108 represent the abstract objective of the application. For example, during the execution of a weather forecast application, diagnostic data 106 may indicate the performance of reading operations on a physical memory of a thermometer. Data visualizations 108 can indicate the abstract objective of the part of the application, measuring the temperature.

To visually link diagnostic data 106 and diagnostic visualizations 108 together, correlation information 110 can include visually similar symbols (e.g., color, mark, etc.) to diagnostic data 106 and diagnostic visualizations 108. Further, correlation information 110 can also include the information for arranging diagnostic data 106 and diagnostic visualization 108 adjacent to each other.

Upon receiving diagnostic data 106, diagnostic visualization 108, and correlation information 110, graphical interface 107 then can display diagnostic data 106 and diagnostic visualization 108 according to correlation information 110.

Figure 2:
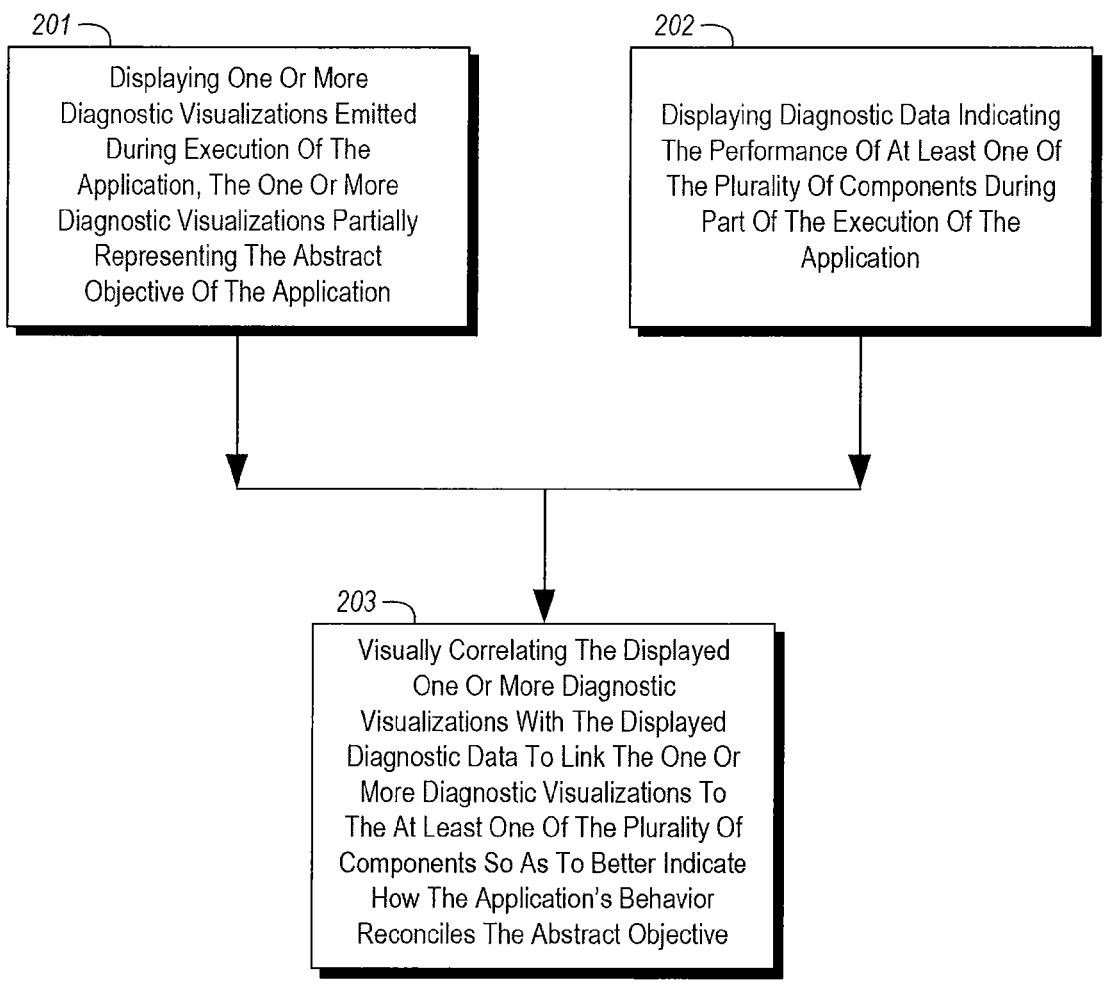
FIG. 2 illustrates a flow chart of an example method for linking diagnostic visualizations to regions of application code.

FIG. 2 illustrates a flow chart of an example method 200 for presenting diagnostic data for the application. Method 200 will be described with respect to the components and data of computer architecture 100.

Method 200 includes an act of displaying one or more diagnostic visualizations emitted during execution of the application, the one or more diagnostic visualizations partially representing the abstract objective of the application (act 201). For example, visualization module 105 can generate diagnostic visualizations 108 and submit diagnostic visualizations 108 to graphical interface 107. Graphical interface 107 can display diagnostic visualization 108. Generally, diagnostic visualizations 108 can represent the abstract objectives of an application, for example, a weather forecast application diagnostic visualizations 108 can represent objectives such as measuring the ground temperature, measuring the atmosphere temperature, measuring the humidity, and etc.

In some embodiments, one or more types of information from diagnostic visualizations 108 can be visually distinguished. The one or more types of information can include flags, messages, and spans. Both flags and messages can represent an instant in time (e.g., an event). Flags can more prominently represent events. For example, a flag can notify a user that the temperature is suspiciously high and allow the user to run a self-diagnose application on the thermometer. Messages can represent events that are less likely to be of interest, but may be useful in the future. For example, a message can notify a user of a previously measured temperature. Flags and messages can allow users to interact with events. Spans can represent a duration of time (e.g., an application phase). For example, a span can represent the duration of execution of measuring ground temperature.

Different types of visual enhancements such as, for example, icons, colors, marks, or combinations thereof can be used to differentiate types of information, such as, for example, flags, messages, and spans. In some embodiments, different icons can be used to differentiate flags, messages, and spans from one another. For example, rectangles can be displayed to represent spans and diamonds can be displayed to represent flags. Colors of visual enhancements can be varied by assigning them to different categories. For example, a first color diamond can be used to present flags for one event category and second different color diamond can be used to present flags for another different event category.

Furthermore, diagnostic visualizations 108 can be decomposed into sub diagnostic visualizations, each sub diagnostic visualization representing a sub-objective of the application. Referring again to the weather forecast application example, the diagnostic visualization—measuring the ground temperature—can be further decomposed into sub diagnostic visualizations such as determining the location of the thermometer, sending measuring request to the thermometer, and writing temperature data to destination storage place.

Method 200 includes an act of displaying diagnostic data indicating the performance of at least one of the plurality of components during part of the execution of the application (act 202). For example, visualization module 105 can generate diagnostic data 106 based on resource utilization data 104 and submit diagnostic data 106 to graphical interface 107. Graphical interface 107 can display diagnostic data 106. Diagnostic data 106 can indicate reading operations from a physical memory of a thermometer, or other components.

Method 200 includes an act of visually correlating the displayed one or more diagnostic visualizations with the displayed diagnostic data to link the one or more diagnostic visualizations to the at least one of the plurality of components so as to better indicate how the application's behavior reconciles the abstract objective (act 203). For example, visualization module 105 can generate correlation information 110 and submit correlation information 110 to graphical interface 107. Graphical interface 107 can use correlation information 110 to correlate diagnostic visualizations 108 with diagnostic data 106. Correlation information 110 may be determined by the user of the computer system. In some embodiments, correlation information 110 may include assigning a same color, a same mark, or a same identification to diagnostic data 106 and the corresponding diagnostic visualization 108. Further, correlation information 110 can also include the information of arranging diagnostic data 106 and diagnostic visualizations 108 adjacent to each other.

FIG. 3 illustrates an example method for color coding the diagnostic visualizations. For example, when visualization module 105 generates diagnostic visualizations 108, different types of diagnostic visualizations are color coded. As depicted in FIG. 3, spans 301 (301A, 301B, 301C, 301D, 301E, 301F, 301G) are assigned with different span fill colors 305. The span text can also be assigned in different span text colors 304. Each span fill color represents a category of span that is also assigned with different numbers 302. The user of the computer system can also input descriptions 303 for each category. Some of the categories may be pre-assigned to certain public API categories 306 such as alert or default.

In one embodiment, flags 307 (307A, 307B, 307C, 307D, 307E, 307F 307G) can be assigned with diamonds in different colors. Messages can be assigned with fill color 308.

Figure 4:
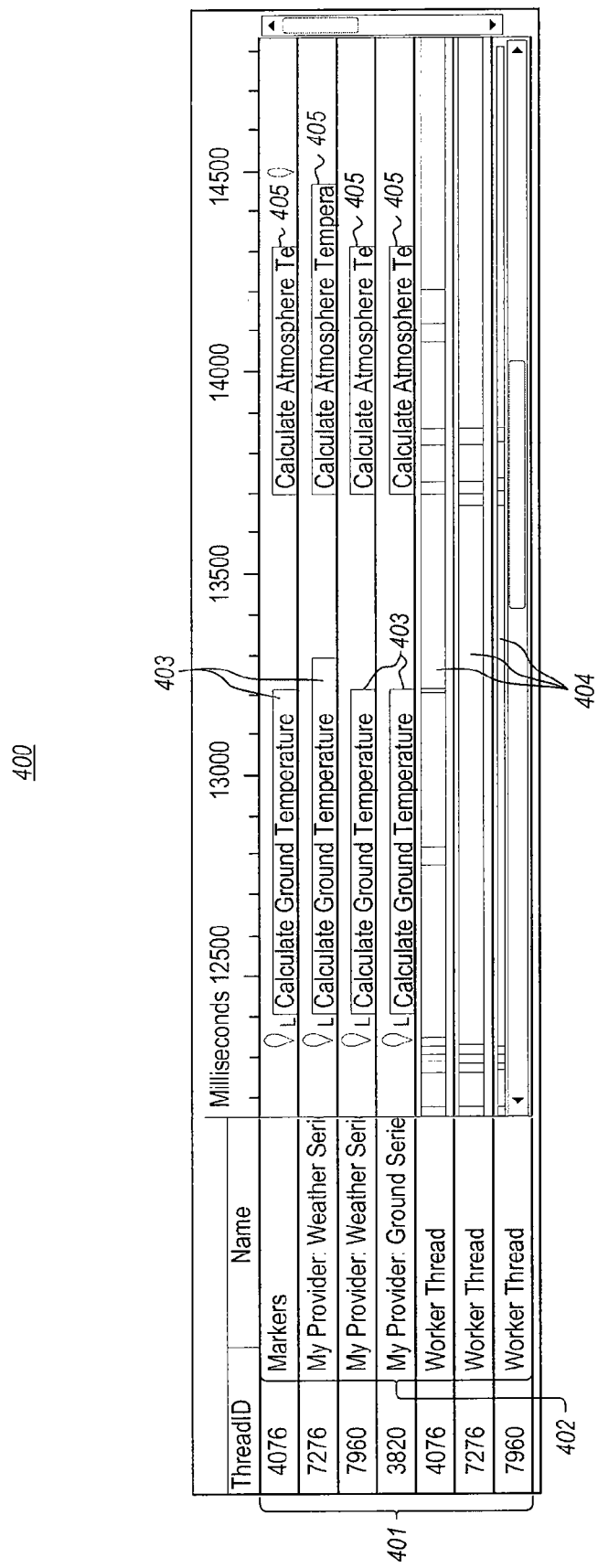
FIG. 4 illustrates a screenshot of an example user interface for linking diagnostic visualizations to regions of application code.

FIG. 4 illustrates a screenshot of an example user interface for linking diagnostic visualizations to regions of application code. For example, the graphical interface 107 can display the diagnostic visualizations 403 and 405 representing different abstract objectives during the execution of the application. Diagnostic data 404 and diagnostic visualizations 403 and 405 are displayed on multiple separate swim lanes. Each diagnostic visualization and diagnostic data is assigned with multiple identifications 401 and names 402. As depicted in FIG. 4, diagnostic visualizations can be grouped together when each diagnostic visualization is assigned a same identification with corresponding diagnostic data. Accordingly, a user can better understand that the abstract objective represented by the diagnostic visualization is correlated with the diagnostic data assigned with the same identification.

Figure 5:
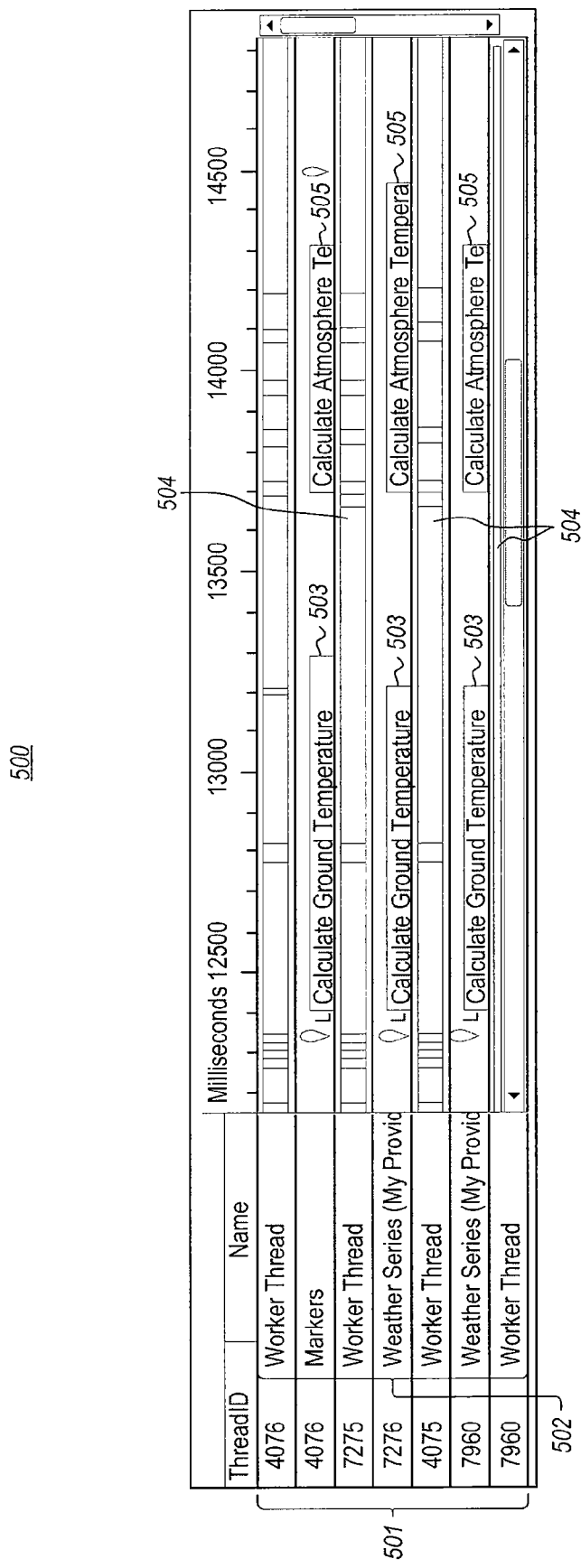
FIG. 5 illustrates a screenshot of another example user interface for linking diagnostic visualizations to regions of application code.

FIG. 5 illustrates a screenshot of another example user interface for linking diagnostic visualizations to regions of application code. For example, the graphical interface 107 can display the diagnostic visualizations 503 and 505 representing different abstract objectives during the execution of the application. The graphical interface 107 may also display identifications 501 and names 502 of the diagnostic visualizations 503 and 505 and diagnostic data 504. As depicted in FIG. 5, diagnostic data 504 is displayed adjacent to the corresponding diagnostic visualizations 503 and 505. Accordingly, a user can better understand the diagnostic visualizations 503 and 505 represent the abstract objective of the application that generates diagnostic data 504.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which

What is claimed is:

1. At a computer system, the computer system including a processor and system memory, a method for presenting diagnostic data for an application, the method comprising:
displaying, at a visualization user interface that represents a timeline of execution of the application, a first swim lane user interface element along the timeline, the first swim lane including one or more diagnostic visualizations emitted during execution of the application, the one or more diagnostic visualizations comprising one or more spans that each represent a duration along the timeline of performance of an abstract objective of the application using one or more hardware components during execution of the application, the one or more diagnostic visualizations including a particular span associated with particular one or more hardware components;
displaying, at the visualization interface, a second swim lane user interface element along the timeline that corresponds to the first swim lane and that is parallel to the first swim lane, the second swim lane including diagnostic data indicating one or more instants in time along the timeline of occurrence one or more events at the one or more hardware components during execution of the application, the diagnostic data including particular one or more events that occurred at the particular one or more hardware components during execution of the application; and
within the visualization interface, visually correlating the displayed one or more diagnostic visualizations with the displayed diagnostic data, including using a same color for the particular span and for the particular one or more events that occurred at the particular one or more hardware components associated with the particular span during execution of the application.

2. The method as recited in claim 1, wherein visually correlating the displayed one or more diagnostic visualizations with the displayed diagnostic data comprises assigning a same identification to the first swim lane and the second swim lane.

3. The method as recited in claim 1, wherein visually correlating the displayed one or more diagnostic visualizations with the displayed diagnostic data comprises displaying each of the diagnostic visualizations adjacent to the corresponding diagnostic data.

4. The method as recited in claim 1, wherein displaying one or more diagnostic visualizations emitted during execution of the application comprises visually distinguishing one or more types of information from the displayed diagnostic visualizations including a plurality of flags, a plurality of messages, and a plurality of spans.

5. The method as recited in claim 4, wherein visually distinguishing one or more types of information from the displayed diagnostic visualizations including a plurality of flags, a plurality of messages, and a plurality of spans comprises visually distinguishing the plurality of spans from one another by assigning one of a plurality of different graphical symbols to each span.

6. The method as recited in claim 4, wherein visually distinguishing one or more types of information from the displayed diagnostic visualizations including a plurality of flags, a plurality of messages, and a plurality of spans comprises visually distinguishing the plurality of flags from one another by assigning one of a plurality of different graphical symbols to each flag.

7. The method as recited in claim 4, wherein the plurality of messages are used to notify a user of a plurality of events within the duration of the application.

8. The method as recited in claim 4, wherein visually distinguishing one or more types of information comprises allocating one of a plurality of visual enhancements to each of the one or more types of information, the plurality of visual enhancements including a plurality of icons, a plurality of colors, a plurality of marks, and a combination thereof.

9. The method as recited in claim 1, wherein displaying one or more diagnostic visualizations emitting during execution of the application further comprises decomposing the diagnostic visualizations into a plurality of sub diagnostic visualizations, wherein each of the plurality of sub diagnostic visualizations represents one of a plurality of abstract sub-objectives of the application.

10. A computer program product comprising one or more hardware storage devices having stored thereon computer-executable instructions that, when executed by a processor, cause a computer system to present diagnostic data for an application, including at least the following:
displaying, at a visualization user interface that represents a timeline of execution of the application, a first swim lane user interface element along the timeline, the first swim lane including one or more diagnostic visualizations emitted during execution of the application, the one or more diagnostic visualizations comprising one or more spans that each represent a duration along the timeline of performance of an abstract objective of the application using one or more hardware components during execution of the application, the one or more diagnostic visualizations including a particular span associated with particular one or more hardware components;
displaying, at the visualization interface, a second swim lane user interface element along the timeline that corresponds to the first swim lane and that is parallel to the first swim lane, the second swim lane including diagnostic data indicating one or more instants in time along the timeline of occurrence one or more events at the one or more hardware components of the computing system during execution of the application, the diagnostic data including particular one or more events that occurred at the particular one or more hardware components during execution of the application; and
within the visualization interface, visually correlating the displayed one or more diagnostic visualizations with the displayed diagnostic data, including using a same color for the particular span and for the particular one or more events that occurred at the particular one or more hardware components associated with the particular span during execution of the application.

11. The computer program product as recited in claim 10, wherein visually correlating the displayed one or more diagnostic visualizations with the displayed diagnostic data comprises assigning a same identification to the first swim lane and the second swim lane.

12. The computer program product as recited in claim 10, wherein visually correlating the displayed one or more diagnostic visualizations with the displayed diagnostic data comprises displaying each of the diagnostic visualizations adjacent to the corresponding diagnostic data.

13. The computer program product as recited in claim 10, wherein displaying the one or more diagnostic visualizations emitted during execution of the application comprises visually associating a plurality of spans with the one or more diagnostic visualizations, the plurality of spans representing the duration of the one or more portions of the application, each of the plurality of spans being visually distinguishable from others of the plurality of spans.

14. The computer program product as recited in claim 10, wherein the plurality of visually distinguishable symbols includes a plurality of flags, a plurality of messages, and a plurality of spans.

15. The computer program product as recited in claim 14, wherein the plurality of flags represent the plurality of events within the duration of the application, the plurality of flags allowing the user to interact with the computer system, each of the plurality of flags being visually distinguishable.

16. The computer program product as recited in claim 14, wherein the plurality of messages notify the user of the computer system of the plurality of events within the duration of the application.

17. The computer program product as recited in claim 14, wherein each of the plurality of visually distinguishable symbols is assigned with a combination of a plurality of icons, a plurality of colors, and a plurality of marks.

18. The computer program product as recited in claim 17, wherein the combination of a plurality of icons, a plurality of colors, and a plurality of marks represents a plurality of different levels of importance.

19. The computer program product as recited in claim 10, wherein displaying one or more diagnostic visualizations emitting during execution of the application comprises decomposes the diagnostic visualizations into a plurality of sub diagnostic visualizations, wherein each of the plurality of sub diagnostic visualizations represents one of a plurality of abstract sub-objectives of the application.

20. A computer system, comprising:
   one or more processors; and
   one or more storage devices having stored thereon computer-executable instructions that, when executed by the one or more processors, cause the computer system to present diagnostic data for an application, including at least the following:
   displaying, at a visualization user interface that represents a timeline of execution of the application, a first swim lane user interface element along the timeline, the first swim lane including one or more diagnostic visualizations emitted during execution of the application, the one or more diagnostic visualizations comprising one or more spans that each represent a duration along the timeline of performance of an abstract objective of the application using one or more hardware components during execution of the application, the one or more diagnostic visualizations including a particular span associated with particular one or more hardware components;
   displaying, at the visualization interface, a second swim lane user interface element along the timeline that corresponds to the first swim lane and that is parallel to the first swim lane, the second swim lane including diagnostic data indicating one or more instants in time along the timeline of occurrence one or more events at the one or more hardware components of the computing system during execution of the application, the diagnostic data including particular one or more events that occurred at the particular one or more hardware components during execution of the application; and
   within the visualization interface, visually correlating the displayed one or more diagnostic visualizations with the displayed diagnostic data, including using a same color for the particular span and for the particular one or more events that occurred at the particular one or more hardware components associated with the particular span during execution of the application.

\* \* \* \* \*